United States Patent [19]
Enstad et al.

[11] Patent Number: 5,360,297
[45] Date of Patent: Nov. 1, 1994

[54] APPARATUS FOR AUTOMATIC LEVEL CONTROL IN A CLOSED CHANNEL OR CONTAINER FOR TRANSPORT AND/OR DISTRIBUTION OF FLUIDIZABLE MATERIAL

[75] Inventors: Gisle G. Enstad, Os; Bernt Nagell, Haugesund, both of Norway

[73] Assignee: Norsk Hydro a.s., Oslo, Norway

[21] Appl. No.: 857,485

[22] Filed: Mar. 25, 1992

[30] Foreign Application Priority Data

Mar. 25, 1991 [NO] Norway ................................. 911178

[51] Int. Cl.⁵ .............................................. B65G 53/18
[52] U.S. Cl. ....................................... 406/89; 406/155
[58] Field of Search ...................... 406/89, 90, 91, 123, 406/138, 155, 122, 164, 167, 133

[56] References Cited

U.S. PATENT DOCUMENTS

| | | | |
|---|---|---|---|
| 1,971,853 | 8/1934 | Ihlefeldt | 406/89 |
| 2,740,671 | 4/1956 | Sayre | 406/155 X |
| 2,802,698 | 8/1957 | Krauss | 406/89 |
| 3,056,632 | 10/1962 | Isler | 406/89 |
| 3,870,374 | 3/1975 | Wentzel, Jr. et al. | 406/155 X |
| 4,279,549 | 7/1981 | Hanrot et al. | 406/90 X |
| 4,299,683 | 11/1981 | Adorno et al. | 406/89 X |
| 4,659,263 | 4/1987 | Hanrot et al. | 406/89 |
| 4,692,068 | 9/1987 | Hanrot et al. | 406/89 |
| 4,930,691 | 6/1990 | Nagell | 222/630 |

FOREIGN PATENT DOCUMENTS

| | | | |
|---|---|---|---|
| 719490 | 4/1942 | Germany | 406/89 |
| 1150320 | 6/1963 | Germany | 406/89 |
| 52-377 | 6/1977 | Japan | 406/89 |
| 736207 | 9/1955 | United Kingdom | 406/122 |
| 1442298 | 7/1976 | United Kingdom | 406/89 |

*Primary Examiner*—David M. Mitchell
*Assistant Examiner*—Andrew C. Pike
*Attorney, Agent, or Firm*—Wenderoth, Lind & Ponack

[57] ABSTRACT

An apparatus having a closed channel or container for transporting and/or distributing fluidizable material includes an air- or gas-permeable wall arranged in the channel and forming a partition between an upper pathway for the fluidizable material and a lower flue to which is fed fluidizing gas from a gas source via a tube. An inlet is provided for feeding fluidizable material to the channel. The apparatus also includes one or more outlets for continual or intermittent run off of material from the channel, and a tube for ventilating the channel. The channel is equipped at its inlet with pipe stub extending into the upper pathway. An area defined under the pipe stub is inactive or is equipped with a separately arranged fluidizing wall with a separate gas feed.

10 Claims, 4 Drawing Sheets

APPARATUS FOR AUTOMATIC LEVEL CONTROL IN A CLOSED CHANNEL OR CONTAINER FOR TRANSPORT AND/OR DISTRIBUTION OF FLUIDIZABLE MATERIAL

BACKGROUND OF THE INVENTION

The present invention concerns an arrangement for automatically controlling the level of fluidizable material in a closed channel or container for transporting and/or distributing such fluidizable material. The present invention comprises an air or gas permeable wall arranged in the channel or container and forming a partition between an upper run or pathway for the fluidizable material and a lower flue which is fed gas from a gas source via a tube, an inlet arranged in the channel or container for feeding fluidizable material to the channel or container, one or a plurality of outlets for continuous or intermittent withdrawal of material from the channel or container, and a tube for ventilating the channel or container.

The invention is particularly applicable as a "temporary" storage and distribution container for equipment used in aluminum electrolysis cells for transporting and intermittently feeding aluminum oxide and aluminum fluoride to such cells. The invention is also particularly applicable to an apportioning apparatus for sacks and bags where fluidizable material is fed in doses. The invention may, however, also be used as a plain transport channel when transporting fluidizable material from a supply area, e.g., a silo or the like, to a feeding site.

The term "fluidizable material" as used herein denotes all solids existing in a finely divided form and having such size, shape, and cohesion that the rate of feeding air streaming in at low velocity causes loss of adhesion between the finely divided particles and a reduction of their inner forces of friction.

The prior art discloses closed equipment for transporting fluidizable material where the material is apportioned from a tank or a channel-like container and where the material in the container is held between an upper level and a lower level by the use of an automatic level control. The equipment functions such that, when the material in the container reaches the lower level, an electric signal is given from the level controller. The signal then acts upon an air valve of the fluidized channel such that the material is transported from a silo or the like via a channel to the container, which then is filled. When the material in the container reaches the upper level, the signal from the level controller is cut off and the feeding of the material is stopped. The level control instrumentation may be of mechanical, optical, ultrasound, or some other type. It is, however, a disadvantage with such equipment where an automatic level control is used that the level control or level switch may fail because of wear or clogging. The equipment therefore requires extensive maintenance and repair, and is expensive to use.

Norwegian Patent No. 160, 130 shows a closed apparatus for transporting powder from a storage site to a feeding area where a horizontal or inclined transport tube is equipped with fluidizing means in the form of a channel with an upper duct for fluidizable material separated from a lower gas flue by a permeable wall. Gas or air is continuously fed to the lower gas flue such that material in the upper duct in the channel is always in a fluidized state. An equilibrium column, also serving as an outlet for the fluidized material, balances with its filling height a pressure Pf for the fluidizing gas. This solution has no level controllers, but requires a very large consumption of air/gas since the fluidizing air always at a pressure greater than Pf must be fed to the channel in order to keep it continuously filed with fluidizable material. Energy consumption therefore is great and such solution is expensive.

SUMMARY OF THE INVENTION

An object of the present invention is to provide a fluidizing channel or container with which it is possible to avoid using level switches, which require considerable maintenance. Another object of the invention is to provide such a channel or container in which energy consumption in the form of pressurized air or another gas is substantially lower than for the known solutions.

The invention achieves these objects by equipping the above-defined channel at its inlet with a pipe stub extending into the upper pathway and by providing under the pipe stub an area which either is not equipped with a fluidizing wall or is equipped with a separately arranged fluidizing wall having a separate gas feed.

With the inventive apparatus, the level of the fluidizable material in the channel is held under the level at the outlet of the pipe stub, and the feeding of air or other gas to the channel can be accurately limited either continually or intermittently such that no more air is fed than absolutely necessary.

BRIEF DESCRIPTION OF THE DRAWINGS

The principles for the operation and a more detailed description of the invention will be provided below with reference to the drawings, wherein.

DETAILED DESCRIPTION OF THE INVENTION

Figure 1:
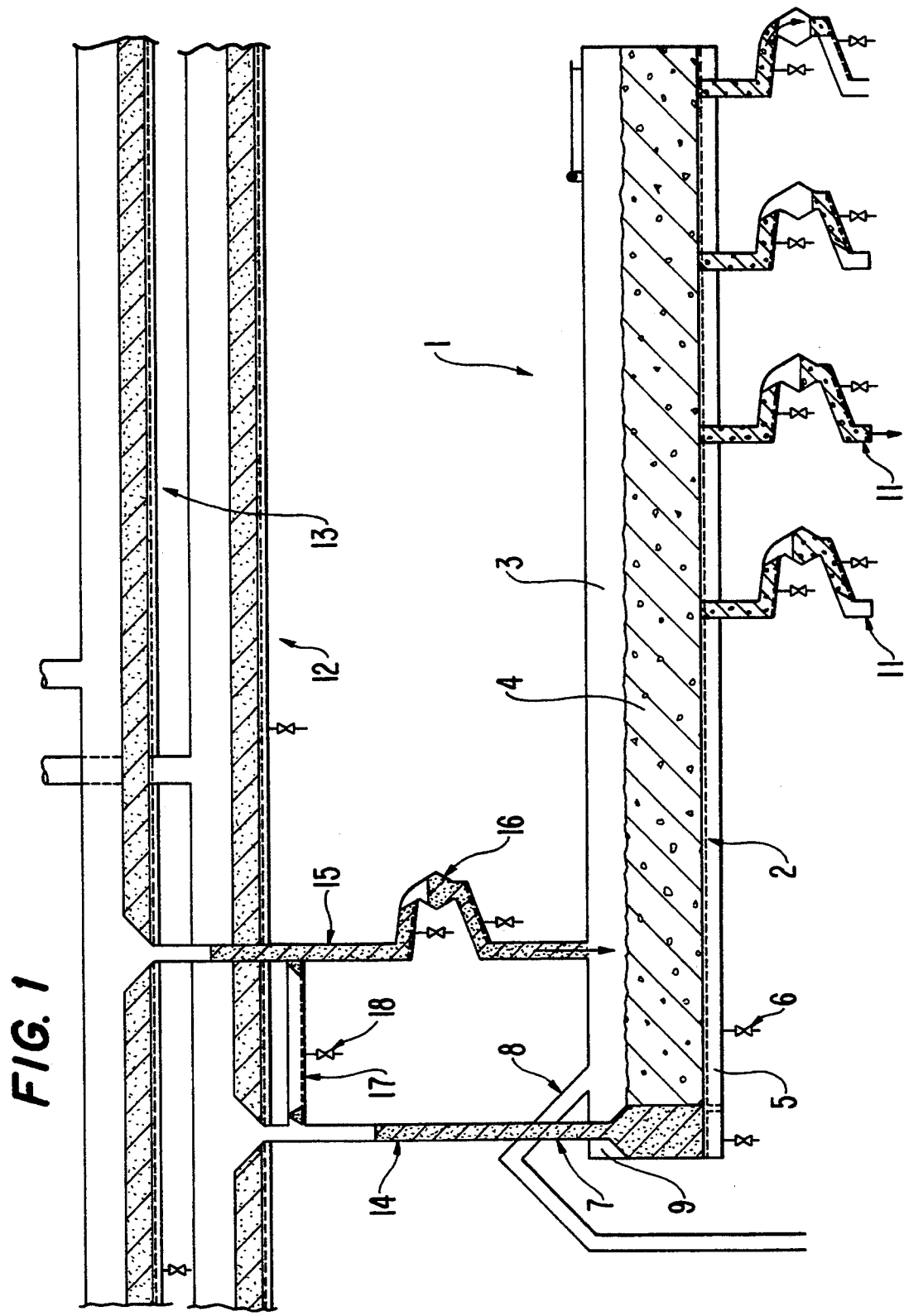
FIG. 1 is a schematic view of the composite inventive concept for transport and apportioning of fluidizable material where a channel or container is an integral part of the invention.

As state above, FIG. 1 shows a sketch of the composite concept for transporting and apportioning fluidizable materials where a channel or container is an integral part of the invention. Further detailed as a preferred embodiment of the inventive concept, FIG. 1 shows an example of equipment for fluidized transport of powdered materials, such as aluminum fluoride and aluminum oxide, to an electrolysis cell for production of aluminum. FIG. 1 shows the arrangement for a cell where aluminum oxide is conducted from a silo or supply site via a transport channel 12 and then through a tube 14 to a distributing channel or distributor container 1. Each cell is equipped with such a distributor container. To apportion material from the container 1, the preferred embodiment uses four dosing devices 11 which may be placed in various places in the cell (not further illustrated). Regarding the dosing devices 11, these are of the same type as described in Norwegian Patent No. 162,774 and will not be further described here.

Aluminum fluoride is conducted in a separate transport channel 13 from its supply source or silo and is further transported via a tube 15 and dosing device 16 to the distributor container 1 where the aluminum fluoride is mixed with aluminum oxide. This solution offers a practical and efficient solution preferable to feeding aluminum fluoride to the cell via separate dosing devices. This solution also offers the possibility of using the transport channel 13 as an alternative feeding channel for aluminum oxide, in case the channel 12 for some reason is rendered inoperative. A fluidizing channel 17 is arranged between tubes 14 and 15. By feeding fluidizing air to channel 17 (e.g. through a pipe stub 18) and simultaneously keeping the dosing device 16 inactive, the material will stream over the tube 14. If it is desirable to use channel 13 to transport aluminum oxide, then the feeding of aluminum fluoride, which is used in substantially smaller quantities, must be performed manually.

Each of the channels 12 and 13, together with the container or the channel 1, operates on the principles forming the basis of the present invention. In the following, the invention therefore will be described further with reference the lowest of the channels, channel 1, shown in FIG. 1 together with FIGS. 2 and 3 which show in greater detail a part of the channel 1 in the area at an inlet thereof where aluminum oxide is conducted into the channel from transport channel 12.

The channel in accordance with the present invention is either arranged horizontally or in an inclined manner. The channel may advantageously be formed with a starting point in a closed fluidizing channel where a fluidizing body as described in Norwegian Patent Application No. 904,306 is used. However, the drawings show an embodiment which is based upon a standard type solution where the closed channel is divided by means of a permeable wall or cloth 2 in such a manner that both an upper pathway 3 for fluidizable materials and a lower flue 5 for air or gas are formed. The material 4 in the channel 1, which may be horizontal or slightly inclined, is fluidized by feeding pressurized air or gas to flue 5 via air feeding pipe 6.

The material is fed to the channel 1 via an inlet 7 having a pipe stub 9 extending into the channel. The pipe stub may be vertically adjustable to facilitate regulation of the degree of filling of the material into the channel as indicated by arrow A. A separate fluidizing zone 21 is arranged under the pipe stub, is isolated from flue 5 by, e.g. a partition 22 and has a respective permeable wall 19 and a respective gas feed 20. During normal operations, zone 21 is inactive. A tube 8 enables venting of the channel.

Figure 2:
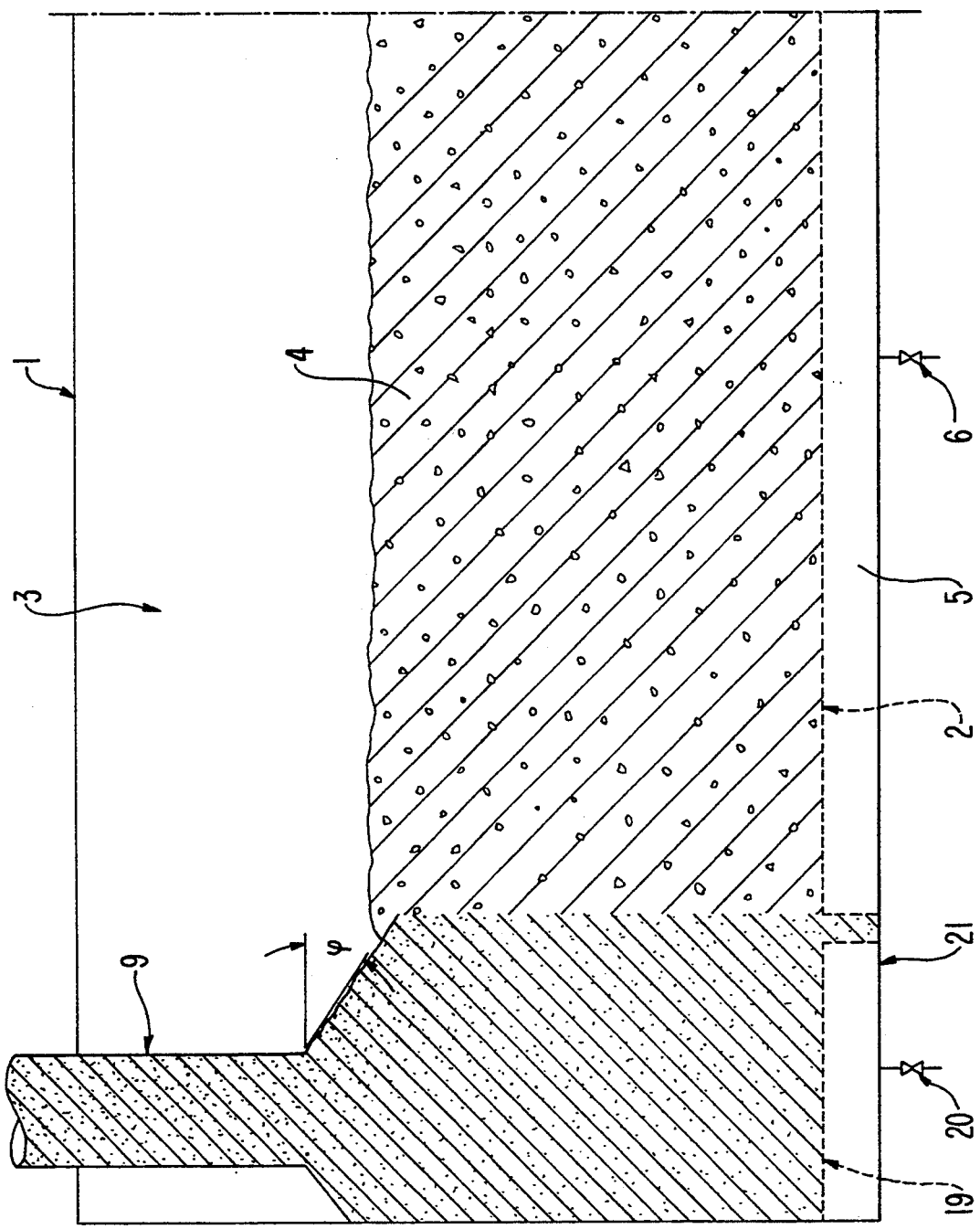
FIG. 2 is an enlarged detail view of a part of the lowest channel shown in FIG. 1 and where material in such channel is at a high level.
Figure 3:
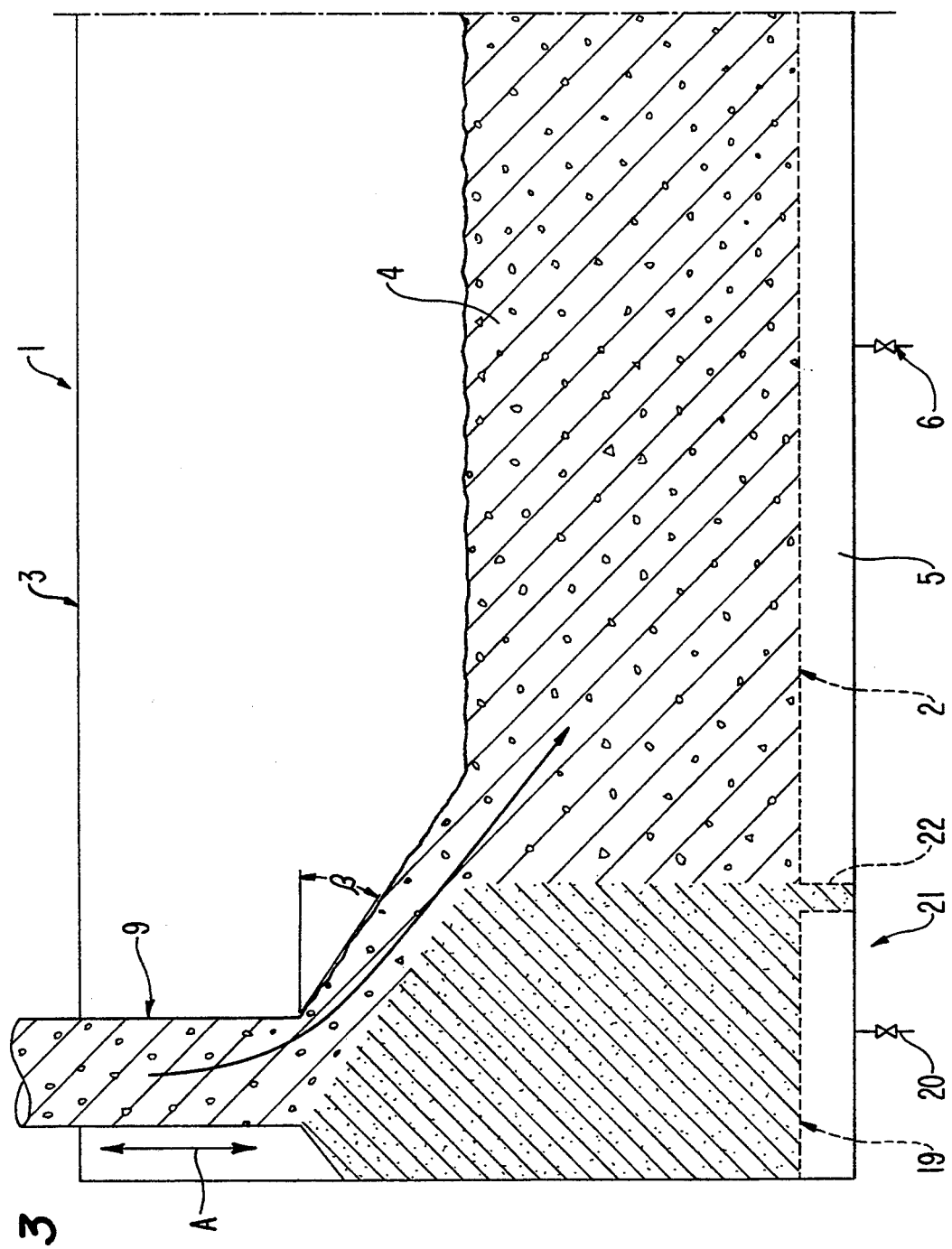
FIG. 3 is a view similar to FIG. 2, but where the material is at a low level.

The invention is based on the principle that when the material in the container outside the zone 21 is fluidized and the material within the zone 21 (that is, material under the pipe stub 9) is held inactive (i.e., is not fluidized), the material will stream into the container as long as the angle $\beta$ of streaming or flowing (FIG. 3) is greater than the sliding angle $\phi$ (i.e. angle of repose) for the material. FIG. 3 shows a situation where the angle $\beta$ of streaming is greater than the sliding angle $\phi$ and where material streams into the channel. In FIG. 2, another situation is shown. Here, the level of the material has become so high that the material no longer streams out into the channel, $\beta \leq \phi$. Based on this principle, the material level in the channel can be regulated without using a separate, complicated level control device requiring extra maintenance. The level is determined without further extra equipment simply by adjustment upwardly or downwardly of the pipe stub 9.

It is clear that the channel in accordance with this preferred embodiment may be continually fed air, outside the zone 21, without the channel becoming overfilled. Such a continual feeding of air will, however, be inefficient and pointless unless there is simultaneously a more or less continual run off of material from the channel. In the embodiment shown in FIG. 1, the channel or container 1 is equipped with the four dosing devices 11. In this embodiment, it will be most advantageous to feed air to the channel each time one of the dosing devices is filled with material. This will provide a type of intermittent operation.

Regarding the separate zone 21, as previously stated, this zone is normally inactive, and the material above zone 21 is stationary. Over elongated periods of time, this material can become "packed". To avoid such packing, it may be necessary to fluidize the material in this area at various intervals of time, dependent upon the type of material being transported, in order to loosen the material. It may also be of interest to use zone 21 in connection with drainage of the channel.

Figure 4:
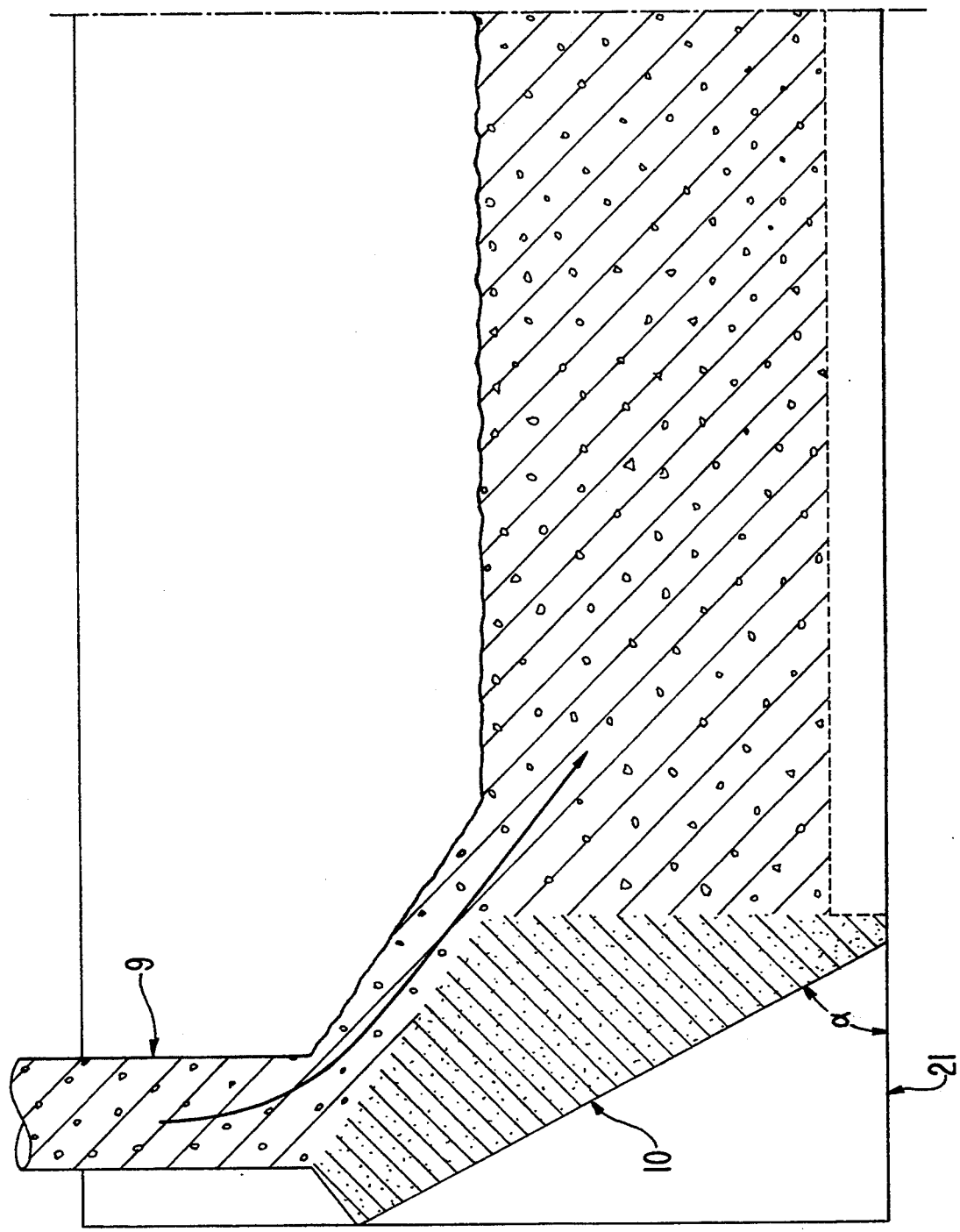
FIG. 4 is a view similar to FIG. 2, but showing an alternative embodiment having an inclined plate or sheet.

FIG. 4 shows an alternative form of zone 21 located under the pipe stub 9. Instead of a separate fluidizing channel, this embodiment shows an apparatus using a sloping wall or plate 10 inclined at angle $\alpha$ greater than sliding angle $\phi$. This plate may be acted upon by a vibrator which "shakes loose" any material having a tendency to pack or cluster.

With the present invention, a fluidizing channel or container has been provided where the level of material can be regulated automatically without a separate level control system. At the same time, the invention provides an apparatus requiring considerably lower air consumption because the feeding of air in a simple manner can be performed intermittently and because low fluidizing pressure and small quantities of fluidizing air are required due to the low material level in the channel.

We claim:

1. In an apparatus for the transport and distribution of a fluidizable material, said apparatus including a closed channel or container having an interior, a gas permeable wall arranged within said interior and defining a partition therein between an upper pathway for the fluidizable material and a lower gas flue, an inlet for feeding the fluidizable material into said pathway and onto said wall, means for supplying gas into said flue such that the gas passes upwardly through said gas permeable wall and fluidizes the fluidizable material thereabove, and at least one outlet means for continuous or intermittent discharge of the fluidizable material from said pathway, the improvement comprising means for automatically controlling the level of the fluidizable material supplied into said pathway and onto said wall upon continuous and intermittent discharge of the fluidizable material therefrom, said level controlling means comprising:

said inlet including a pipe stub extending into said pathway, said pipe stub being movable upwardly and downwardly; and means for preventing the fluidizable material in a portion of said interior located below said pipe stub from being fluidized by said gas supplying means, such that the fluidizable material in said portion of said interior remains stationary and additional fluidizable material supplied thereon flows thereover and onto said wall to be fluidized.

2. The improvement claimed in claim 1, wherein said preventing means comprises means for isolating a portion of said flue located below said pipe stub from said gas supplying means such that gas supplied therefrom cannot enter said flue portion.

3. The improvement claimed in claim 2, further comprising auxiliary gas supplying means, independent of said gas supplying means, for selectively supplying gas to said flue portion to prevent packing of the fluidizable material in said portion of said interior.

4. The improvement claimed in claim 1, wherein said preventing means comprises a gas impermeable plate positioned below said pipe stub and inclined at an angle greater than the angle of repose of the fluidizable material.

5. The improvement claimed in claim 1, wherein said gas supplying means continuously feeds the gas to said flue.

6. The improvement claimed in claim 1, comprising plural, independently operable said outlet means.

7. The improvement claimed in claim 6, wherein said outlet means comprise respective dosing devices.

8. The improvement claimed in claim 6, wherein said gas supplying means is operable to supply gas into said flue concurrently with the operation of any of said plural outlet means.

9. The improvement claimed in claim 1, wherein said pathway is free of internal baffles and partitions.

10. The improvement claimed in claim 1, wherein that portion of said flue from which gas supplied from said gas supplying means passes through said wall is free of internal baffles and partitions.

* * * * *